US009340270B2

(12) United States Patent
Ueno

(10) Patent No.: US 9,340,270 B2
(45) Date of Patent: May 17, 2016

(54) NAUTICAL AUTOMATIC STEERING DEVICE, AUTOMATIC STEERING METHOD, AND NON-TRANSITORY COMPUTER-READABLE MEDIUM STORING AUTOMATIC STEERING PROGRAM

(71) Applicant: FURUNO Electric Company Limited, Nishinomiya, Hyogo (JP)

(72) Inventor: Hideki Ueno, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 0 days.

(21) Appl. No.: 14/181,265

(22) Filed: Feb. 14, 2014

(65) Prior Publication Data

US 2014/0244081 A1 Aug. 28, 2014

(30) Foreign Application Priority Data

Feb. 27, 2013 (JP) ................................. 2013-037930

(51) Int. Cl.
*B63H 25/04* (2006.01)
*G05D 1/02* (2006.01)
*B63H 25/02* (2006.01)

(52) U.S. Cl.
CPC .............. *B63H 25/04* (2013.01); *G05D 1/0206* (2013.01); *B63H 25/02* (2013.01)

(58) Field of Classification Search
CPC ............................. B63H 25/04; G05D 1/0206
See application file for complete search history.

(56) References Cited

U.S. PATENT DOCUMENTS 7,769,504 B2 * 8/2010 Kaji .................................. 701/21
8,265,812 B2 * 9/2012 Pease .............................. 701/21

FOREIGN PATENT DOCUMENTS

JP S54-033493 A 3/1979
JP S62-113695 A 5/1987

OTHER PUBLICATIONS

Fossen, "Handbook of Marine Craft Hydronamics and Motion Control", (Apr. 2011), pp. 377-384.*

* cited by examiner

*Primary Examiner* — Todd Melton
(74) *Attorney, Agent, or Firm* — Global IP Counselors, LLP

(57) ABSTRACT

There is provided an automatic steering device with which a heading can be stably controlled even under powerful disturbance. The control computer 8 outputs an ordered rudder angle calculated based on the drift angle and the turning angular velocity. The angular velocity inversion timing acquisition component 21 acquires a timing at which the turning angular velocity changes from a direction in which a divergence of the drift angle from zero increases to a direction in which the divergence decreases. The steering stop command component 22 orders a steering stop based on the above-mentioned timing. The steering gear controller 10 controls a steering gear such that it changes a rudder angle of the steering gear based on the ordered rudder angle, and such that it does not change the rudder angle while a command of the steering stop has been received.

18 Claims, 5 Drawing Sheets

NAUTICAL AUTOMATIC STEERING DEVICE, AUTOMATIC STEERING METHOD, AND NON-TRANSITORY COMPUTER-READABLE MEDIUM STORING AUTOMATIC STEERING PROGRAM

CROSS-REFERENCE TO RELATED APPLICATIONS

This application claims priority to Japanese Patent Application No. 2013-037930 filed on Feb. 27, 2013. The entire disclosure of Japanese Patent Application No. 2013-037930 is hereby incorporated herein by reference.

BACKGROUND

1. Field of the Invention

The present invention relates primarily to an automatic steering device. More precisely, it relates to a configuration for better stabilizing the course in an automatic steering device.

2. Background Information

It generally takes a certain amount of time for the hull of a ship to start turning after a steering input. And once the hull begins to turn, that turning will continue for a while after the rudder has been returned to its neutral position, so the rudder must be returned quickly in order to assume the desired course. The steering of a ship thus entails its own unique difficulty, and considerable skill is required to reliably and quickly carry out the operation needed to bring the prow of a ship around to the desired orientation. Also, at sea a ship is affected by waves, wind, and other such external disturbances, so steering that will cancel out these external disturbances is required in order to keep the vessel proceeding in a straight line. Because of the above-mentioned steering difficulty, however, just keeping the vessel going straight demands considerable concentration, and this imposes a burden on the helmsman.

A maritime automatic steering device (auto pilot) is installed in vessels to lessen this burden on the helmsman. A typical automatic steering device is configured such that the heading in which the prow is supposed to be pointed (the charted course) is inputted as a target value, and the steering gear (an operation element) is operated to automatically change the rudder angle, thereby matching the heading (a control amount) with the charted course. This control can be performed by a known method. Well known examples of such methods include acquiring a deviation angle of the heading with respect to the target heading and turning the rudder in proportion to this deviation angle (proportional control; P control), turning the rudder in proportion to the sum of past deviation angles (integral control; I control), and acquiring the rate of change of the deviation angle and turning the rudder in proportion to this rate of change (differential control; D control), among others.

Automatic steering devices of this type are disclosed in Japanese Unexamined Patent Application Publication Nos. S62-113695 (Patent Literature 1) and S54-33493 (Patent Literature 2), for example. With the maritime automatic steering device in Patent Literature 1, an estimated heading signal and an estimated turning angular velocity signal are found from a heading signal outputted by a gyro compass, an optimal rudder angle command is calculated based on this, and this command is outputted to the steering gear. Patent Literature 2 discloses an online, real-time, optimal steering system that is incorporated into an auto pilot stand, which is configured such that external disturbances in the ocean or the sea region in which the vessel is sailing are measured and analyzed during operation, and an evaluation function for optimal control is varied according to these external disturbances.

SUMMARY

With the above-mentioned automatic steering devices, however, if course control is performed to correct left and right wandering of the prow while sailing, then when the ship is subjected to powerful external disturbances such as rough weather, steering corrections to the prow direction will not be able to keep up, and the heading will exhibit behavior similar to divergence, so the vessel ends up zigzagging greatly.

For example, with the maritime automatic steering device in Patent Literature 1, if the deviation in heading from the charted course diverges greatly from zero, and the turning angular velocity is not only in the direction of increasing the above-mentioned divergence, but is also large, then the steering engine is controlled so as to crank the rudder at a correspondingly large angle. Since momentum is acting on the hull here, if the rudder is turned in an attempt to return the heading deviation to zero, this deviation usually swings past zero and over to the opposite side, and this over-correction must be rectified by turning the rudder the other way. However, if the rudder angle imparted to the steering engine is too large when the heading deviation swings widely to one side, rudder correction when the effect of steering causes the deviation to swing to the other side will end up being too late, since the rudder is also subjected to water resistance, and as a result, a large rudder angle on the opposite side has to be imparted to the steering engine. This repeated action becomes a vicious cycle, producing the above-mentioned expansion (divergence) in heading wandering, which ends up decreasing the stability of automatic steering of the vessel.

The present invention was conceived in light of the above situation, and it is an object thereof to provide an automatic steering device with which the heading can be stably controlled even under powerful external disturbances.

With a first aspect of the present invention, there is provided an automatic steering device with the following configuration. Specifically, this automatic steering device includes a drift angle acquisition component, a turning angular velocity acquisition component, a controller, an angular velocity inversion timing acquisition component, a steering stop command component, and a steering gear controller. The drift angle acquisition component acquires a drift angle, which is a deviation angle of a heading with respect to a target heading. The turning angular velocity acquisition component acquires a turning angular velocity, which is a rate at which the drift angle changes. The controller calculates a rudder angle based on at least the drift angle and the turning angular velocity, and outputs the rudder angle as an ordered rudder angle. The angular velocity inversion timing acquisition component acquires an angular velocity inversion timing, which is a timing at which the turning angular velocity changes from a direction in which a divergence of the drift angle from zero increases to a direction in which the divergence decreases. The steering stop command component orders a steering stop based on the angular velocity inversion timing. The steering gear controller changes a rudder angle of a steering gear based on the ordered rudder angle, and controls the rudder angle of the steering gear to maintain the rudder angle unchanged while a command of the steering stop has been received from the steering stop command component.

Consequently, excessive turning of the rudder can be suppressed even when the drift angle has swung widely to one side, so rudder corrections corresponding to situations in which a drift angle subsequently returns can be made quickly. As a result, the heading can be kept close to the target heading, and the stability of automatic steering can be improved.

The above-mentioned automatic steering device preferably has the following configuration. Specifically, this automatic steering device further includes a drift angle inversion timing acquisition component and a steering restart command component. The drift angle inversion timing acquisition component acquires a drift angle inversion timing, which is a timing at which the divergence of the drift angle from zero that has been increasing starts to decrease. The steering restart command component orders a steering restart based on the drift angle inversion timing while the steering stop has been ordered by the steering stop command component.

Consequently, steering is restarted at the timing when divergence of the drift angle from zero begins to change to a direction of becoming smaller, which prevents delay in rudder return control and better stabilizes the automatic steering.

The above-mentioned automatic steering device preferably has the following configuration. Specifically, this automatic steering device further includes a second angular velocity inversion timing acquisition component and a steering restart command component. The second angular velocity inversion timing acquisition component acquires a second angular velocity inversion timing, which is a timing at which the turning angular velocity changes from the direction in which the divergence of the drift angle from zero increases to the direction in which the divergence decreases. The steering restart command component orders a steering restart based on the second angular velocity inversion timing while the steering stop has been ordered by the steering stop command component.

Consequently, when even greater external disturbances are exerted on the vessel while steering is stopped, the steering stoppage is released and the rudder can be turned appropriately, so both stability and flexibility can be achieved in automatic steering.

The above-mentioned automatic steering device preferably has the following configuration. Specifically, the controller continues calculating and ordering the rudder angle based on at least the drift angle and the turning angular velocity, even in a state in which the steering stop command component has ordered the steering stop. The steering gear controller changes the rudder angle of the steering gear based on the current ordered rudder angle from the controller while the steering restart command component has ordered the steering restart.

Consequently, modulated steering can be achieved by using the controller for basic rudder angle control, and holding the rudder during steering stoppage, and allowing sudden return of the rudder during steering restarting.

A second aspect of the present invention provides an automatic steering method in which an ordered rudder angle is outputted to a steering gear to match a heading to a target heading. The automatic steering method includes the following steps. Specifically, this automatic steering method includes a drift angle acquisition step, a turning angular velocity acquisition step, a control step, an angular velocity inversion timing acquisition step, a steering stop command step, and a steering gear control step. The drift angle acquisition step includes acquiring a drift angle, which is a deviation angle of the heading with respect to the target heading. The turning angular velocity acquisition step includes acquiring a turning angular velocity, which is a rate at which the drift angle changes. The control step includes calculating a rudder angle based on at least the drift angle and the turning angular velocity, and outputting the rudder angle as an ordered rudder angle. The angular velocity inversion timing acquisition step includes acquiring an angular velocity inversion timing, which is a timing at which the turning angular velocity changes from a direction in which a divergence of the drift angle from zero increases to a direction in which the divergence decreases. The steering stop command step includes ordering a steering stop based on the angular velocity inversion timing. The steering gear control step includes changing a rudder angle of the steering gear based on the ordered rudder angle, and controlling the rudder angle of the steering gear to maintain the rudder angle unchanged while a command of the steering stop has been received.

Consequently, excessive turning of the rudder can be suppressed even when the drift angle has swung widely to one side, so rudder corrections corresponding to situations in which a drift angle subsequently returns can be made quickly. As a result, the heading can be kept close to the target heading, and the stability of automatic steering can be improved.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
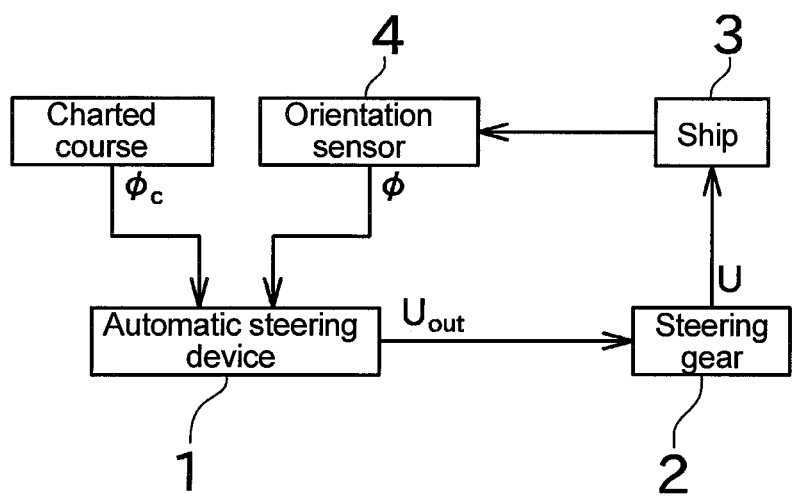
FIG. 1 is a block diagram of the overall configuration of the automatic steering system pertaining to an embodiment of the present invention.

FIG. 1 shows an automatic steering system featuring the maritime automatic steering device pertaining to an embodiment of the present invention. This automatic steering system includes an automatic steering device 1, steering gear 2, a ship 3, and an orientation sensor 4. The automatic steering device 1, the steering gear 2, and the orientation sensor 4 are installed in the ship 3.

The orientation sensor 4 is configured to detect the heading $\phi$ of the ship 3, and output this to the automatic steering device 1.

The automatic steering device 1 is configured so that the helmsman can input a charted course $\phi_c$ (the heading in which the ship is supposed to proceed; target heading). The automatic steering device 1 outputs a rudder angle signal $U_{out}$ that designates the rudder angle U of the steering gear 2, so that the heading $\phi$ as a control amount will match the charted course $\phi_c$ as a target value.

The steering gear 2 is configured so as to change the rudder angle U according to the rudder angle signal $U_{out}$. The heading $\phi$ of the ship 3 can be controlled while underway by suitably adjusting this rudder angle U.

Because of the above configuration, the heading $\phi$ of the ship 3 can be controlled to match the charted course $\phi_c$.

Next, the configuration of the automatic steering device 1 will be described in detail.

The automatic steering device 1 in this embodiment is made up of a CPU, a ROM, a RAM, and other such hardware (not shown), and an automatic steering program or other such software stored in the above-mentioned ROM.

The automatic steering program is used to have the automatic steering device 1 carry out the automatic steering method pertaining to the present invention. This automatic steering method includes a drift angle acquisition step, a turning angular velocity acquisition step, a control step, an angular velocity inversion timing acquisition step, a steering stop command step, a drift angle inversion timing acquisition step, a second angular velocity inversion timing acquisition step, a steering restart command step, and a steering gear control step.

Therefore, the automatic steering program that is used to carry out this automatic steering method includes a drift angle acquisition step, a turning angular velocity acquisition step, a control step, an angular velocity inversion timing acquisition step, a steering stop command step, a drift angle inversion timing acquisition step, a second angular velocity inversion timing acquisition step, a steering restart command step, and a steering gear control step, which respectively correspond to the steps in the above-mentioned method. The above-mentioned hardware and software operate in conjunction to allow the automatic steering device 1 to function as the drift angle acquisition component 5, the turning angular velocity acquisition component 6, the control computer (controller) 8, the angular velocity inversion timing acquisition component 21, the steering stop command component 22, the drift angle inversion timing acquisition component 23, the second angular velocity inversion timing acquisition component 24, the steering restart command component 25, the steering gear controller 10, and so forth shown in FIG. 2.

Figure 2:
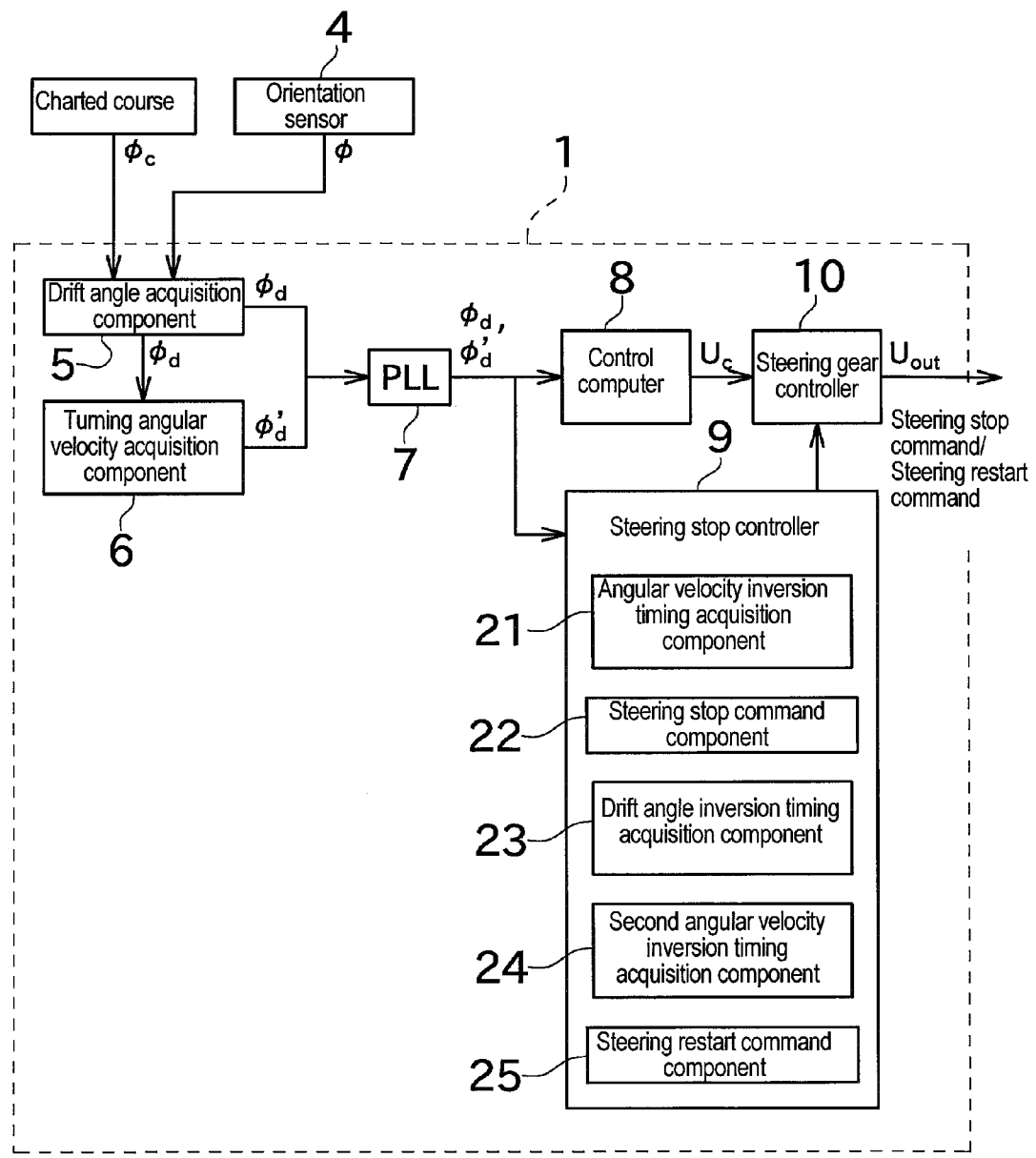
FIG. 2 is a block diagram of the configuration of an automatic steering device.

Next, the functional configuration of the automatic steering device 1 will be described through reference to FIG. 2.

The charted course $\phi_c$ set by the helmsman is inputted to the drift angle acquisition component 5. The drift angle acquisition component 5 calculates the drift angle $\phi_d$ based on the inputted charted course $\phi_c$ and the heading $\phi$ inputted from the orientation sensor 4.

The drift angle $\phi_d$ is the angle formed by the heading $\phi$ and the charted course $\phi_c$, and in this embodiment the drift angle $\phi_d$ is zero when the heading $\phi$ completely matches the charted course $\phi_c$, is a positive value when the heading $\phi$ has deviated from the charted course $\phi_c$ to the right side in the forward direction, and is a negative value when the deviation is to the left side in the forward direction. The processing done by the drift angle acquisition component 5 corresponds to the drift angle acquisition step of the automatic steering program. The drift angle $\phi_d$ acquired by the drift angle acquisition component 5 is inputted to the turning angular velocity acquisition component 6 and a PLL 7.

The drift angle $\phi_d$ is repeatedly inputted from the drift angle acquisition component 5 to the turning angular velocity acquisition component 6 at specific time intervals. The turning angular velocity acquisition component 6 calculates a turning angular velocity $\phi_d'$ corresponding to a first-order differentiation of the drift angle $\phi_d$, from the change in the drift angle $\phi_d$ over time. The processing done by this turning angular velocity acquisition component 6 corresponds to the turning angular velocity acquisition step of the automatic steering program. The turning angular velocity acquisition component 6 outputs the acquired turning angular velocity $\phi_d'$ to the PLL 7.

The PLL 7 is configured as a type of low-pass filter, and removes the high-frequency component by performing averaging processing on the drift angle $\phi_d$ and the turning angular velocity $\phi_d'$ repeatedly inputted at specific time intervals. The PLL 7 outputs the averaged drift angle $\phi_d$ and turning angular velocity $\phi_d'$ to the control computer 8 and a steering stop controller 9.

The control computer 8 calculates an ordered rudder angle $U_c$ that is to be imparted to the steering gear 2 in order to move the drift angle $\phi_d$ closer to zero (to match the heading $\phi$ to the charted course $\phi_c$), based on the inputted drift angle $\phi_d$ and turning angular velocity $\phi_d'$, and outputs this ordered rudder angle $U_c$ to the steering gear controller 10. The calculation of the ordered rudder angle $U_c$ can be done with a known method (such as PID control), so this will not be described in detail here. With the above configuration, the heading $\phi$ can be matched to the charted course $\phi_c$, and the ship 3 can be made to sail along the course intended by the helmsman. The processing done by the control computer 8 corresponds to the control step of the automatic steering program.

The steering stop controller 9 determines, based on the inputted drift angle $\phi_d$ and turning angular velocity $\phi_d'$, whether to have the steering gear controller 10 steer according to the ordered rudder angle $U_c$ from the control computer 8, or not to turn the rudder (ignore the ordered rudder angle $U_c$) and instead maintain the current rudder angle, and outputs a signal to the steering gear controller 10 according to the result of this determination. More specifically, if the steering stop controller 9 determines not to have the steering gear controller 10 turn the rudder and instead to maintain the current rudder angle, then a steering stop command is outputted to the steering gear controller 10. If the steering stop controller 9 determines to have the steering gear controller 10 steer normally, then the steering stop controller 9 outputs a steering restart command to the steering gear controller 10.

The configuration of the steering stop controller 9 will now be described in detail. The steering stop controller 9 comprises the angular velocity inversion timing acquisition component 21, the steering stop command component 22, the drift angle inversion timing acquisition component 23, the second angular velocity inversion timing acquisition component 24, and the steering restart command component 25. The processing done by the angular velocity inversion timing acquisition component 21, the steering stop command component 22, the drift angle inversion timing acquisition component 23, the second angular velocity inversion timing acquisition component 24, and the steering restart command component 25 corresponds to the angular velocity inversion timing acquisition step, the steering stop command step, the drift angle inversion timing acquisition step, the second angular velocity inversion timing acquisition step, and the steering restart command step, respectively, in the automatic steering program.

The angular velocity inversion timing acquisition component 21 detects and acquires the timing (angular velocity inversion timing) at which the turning angular velocity $\phi_d'$ changes from a direction in which the divergence of the drift angle $\phi_d$ from zero increases to a direction in which it decreases. More specifically, the angular velocity inversion timing acquisition component 21 detects and acquires the timing at which an angular acceleration $\phi_d''$ obtained by differentiating the inputted turning angular velocity $\phi_d'$ crosses zero from positive to negative while the drift angle $\phi_d$ is in the positive region, and the timing at which this crosses zero from negative to positive while the drift angle $\phi_d$ is in the negative region.

The steering stop command component 22 instructs the steering gear controller 10 to instantly stop steering when the angular velocity inversion timing acquisition component 21 has detected the angular velocity inversion timing.

The drift angle inversion timing acquisition component 23 detects and acquires the timing (drift angle inversion timing) at which drift angle $\phi_d$ whose divergence from zero has been increasing begins to decrease in its divergence. More specifically, the drift angle inversion timing acquisition component 23 detects and acquires the timing at which the inputted turning angular velocity $\phi_d'$ crosses zero from positive to negative, or from negative to positive.

The second angular velocity inversion timing acquisition component 24 does the opposite of the angular velocity inversion timing acquisition component 21 in that it detects and acquires the timing (second angular velocity inversion timing) at which the turning angular velocity $\phi_d'$ changes from a direction in which the divergence of the drift angle $\phi_d$ from zero is decreasing to a direction in which it is increasing. More specifically, the second angular velocity inversion timing acquisition component 24 detects and acquires the timing at which the angular acceleration $\phi_d''$ crosses zero from negative to positive when the drift angle $\phi_c''$ is in the positive region, and the timing at which the angular acceleration $\phi_d''$ crosses zero from positive to negative when the drift angle $\phi_d$ is in the negative region.

The steering restart command component 25 instructs the steering gear controller 10 to instantly restart steering when the second angular velocity inversion timing acquisition component 24 has detected the second angular velocity inversion timing, or when the drift angle inversion timing acquisition component 23 has detected the drift angle inversion timing, in a state in which the steering stop command component 22 has instructed the steering gear controller 10 to stop steering.

The steering gear controller 10 outputs the rudder angle signal $U_{out}$ that designates the rudder angle U of the steering gear 2, based on the ordered rudder angle $U_c$ inputted from the control computer 8, and the steering stop command and steering restart command inputted from the steering stop controller 9. The processing done by the steering gear controller 10 corresponds to the steering gear control step of the automatic steering program.

The operation of the steering gear controller 10 will be described in specific terms. The steering gear controller 10 has two modes: normal mode and steering stop mode.

In normal mode, the steering gear controller 10 stores the ordered rudder angle $U_c$ inputted from the control computer 8 and outputs it unchanged as the rudder angle signal $U_{out}$. Meanwhile, when a steering stop command is inputted from the steering stop controller 9, the steering gear controller 10 switches to steering stop mode, and outputs the ordered rudder angle $U_c$ that was inputted and stored immediately prior to the mode switch (hereinafter also referred to as the "stored rudder angle") as the rudder angle signal $U_{out}$. In steering stop mode, the control computer 8 continuously outputs the ordered rudder angle $U_c$ to the steering gear controller 10, but the steering gear controller 10 ignores the ever-changing ordered rudder angle $U_c$, and outputs the above-mentioned stored rudder angle, which is a fixed value, as the rudder angle signal $U_{out}$ to the steering gear 2. Therefore, in steering stop mode, the rudder angle indicated by the outputted rudder angle signal $U_{out}$ is constant. If a steering restart command from the steering stop controller 9 is inputted to the steering gear controller 10, the steering stop mode of the steering gear controller 10 is released, and the mode switches to normal mode.

Figure 3:
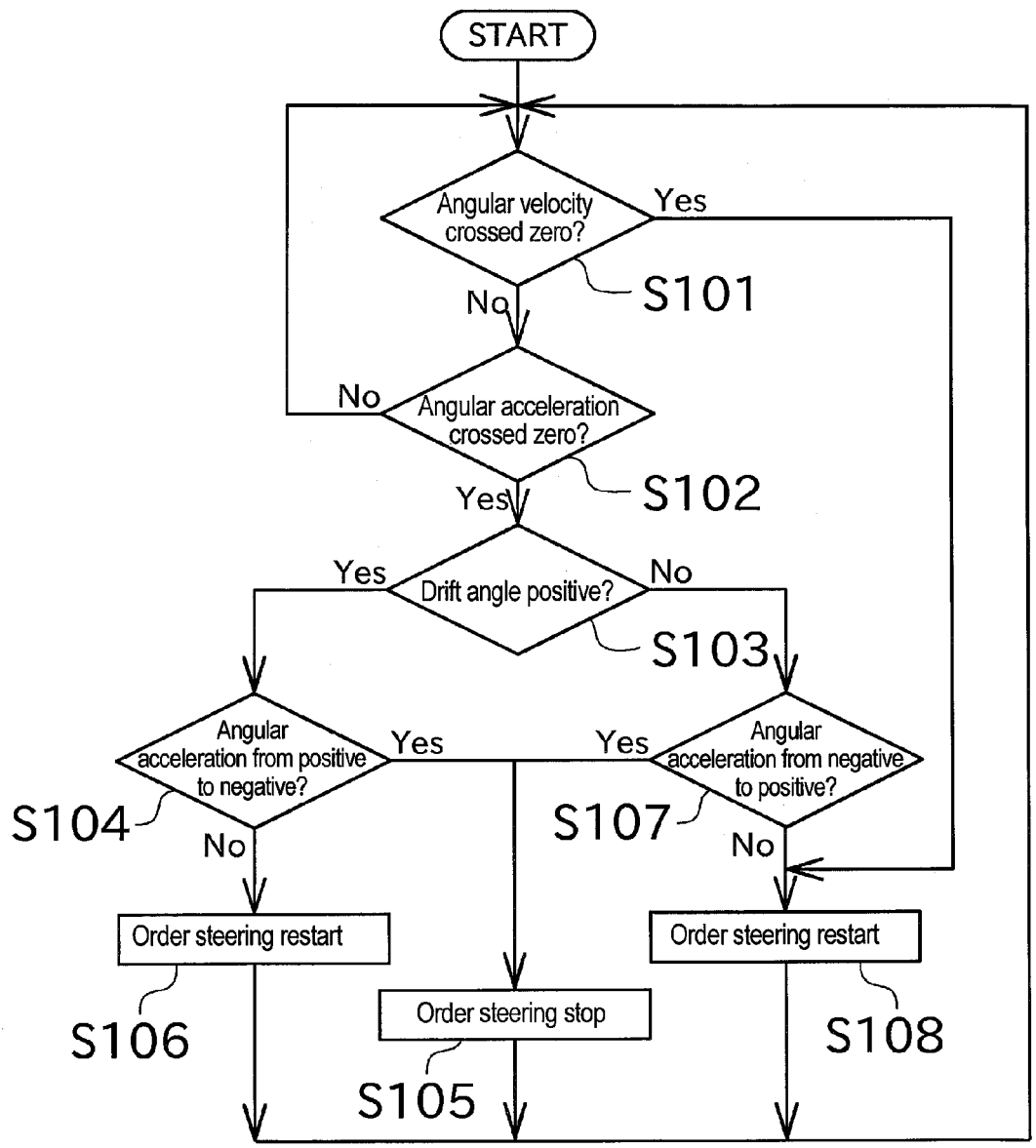
FIG. 3 is a flowchart showing the processing performed by a steering stop controller.

Next, the processing of the steering stop controller 9 will be described in detail through reference to the flowchart in FIG. 3.

When the processing starts, the CPU operating as the steering stop controller 9 checks the value of the turning angular velocity $\phi_d'$ constantly being inputted from the PLL 7, and determines whether or not this turning angular velocity $\phi_d'$ has crossed zero, that is, whether or not the change goes past zero (S101). If the determination in S101 is that the turning angular velocity $\phi_d'$ has crossed zero, the processing moves to S108, and the CPU outputs a steering restart command to the steering gear controller 10 (if the steering gear controller 10 had already been ordered to stop steering), and the flow returns to S101.

If it is determined in S101 that the turning angular velocity $\phi_d'$ has not crossed zero, the CPU checks the value of the angular acceleration $\phi_d''$ obtained from the change in the turning angular velocity $\phi_d'$ over time, and determines whether or not this angular acceleration $\phi_d''$ has crossed zero, that is, whether or not the change goes past zero (S102). This angular acceleration $\phi_d''$ corresponds to a first-order differentiation of the turning angular velocity $\phi_d'$, and corresponds to a second-order differentiation of the drift angle $\phi_d$. If it is determined in S102 that the angular acceleration $\phi_d''$ has not crossed zero, the flow returns to S101.

If it is determined in S102 that the angular acceleration $\phi_d''$ has crossed zero, it is determined in S103 whether or not the drift angle $\phi_d$ is positive. If the drift angle $\phi_d$ is positive, it is determined in S104 whether or not the direction in which the angular acceleration $\phi_d''$ has crossed zero is from positive to negative. If it is determined in S104 that the direction in which the angular acceleration $\phi p_d''$ has crossed zero is from positive to negative, the processing moves to S105, and the CPU outputs a steering stop command to the steering gear controller 10. If it is determined in S104 that the direction in which the angular acceleration $\phi_d''$ has crossed zero is from negative to positive, the processing moves to S106, and the CPU outputs a steering restart command to the steering gear controller 10. After this the flow returns to S101.

If it is determined in S103 that the drift angle $\phi_d$ is negative, it is determined in S107 whether or not the direction in which the angular acceleration $\phi_d''$ has crossed zero is from negative to positive. If it is determined in S107 that the direction in which the angular acceleration $\phi_d''$ has crossed zero is from negative to positive, the processing moves to S105, and the CPU outputs a steering stop command to the steering gear controller 10. If it is determined in S107 that the direction in which the angular acceleration $\phi_d''$ has crossed zero is from positive to negative, the processing moves to S108, and the CPU outputs a steering restart command to the steering gear controller 10. After this the flow returns to S101.

In the above flow, the processing done by the angular velocity inversion timing acquisition component 21 and the steering stop command component 22 corresponds to S103, S104 (S107), and S105. The processing done by the drift angle inversion timing acquisition component 23 and the steering restart command component 25 corresponds to S101 and S108. The processing done by the second angular velocity inversion timing acquisition component 24 and the steering restart command component 25 corresponds to S103, S104 (S107), and S106 (S108).

The effect of the control expressed by the above flow will now be described. Let us assume that for some reason such as external disturbance, the drift angle $\phi_d$ has occurred in either the positive or negative direction in the ship 3, and furthermore that the ship 3 (the heading $\phi$) is turning in the direction in which this drift angle $\phi_d$ is worsening. In this case, the control computer 8 calculates the ordered rudder angle $U_c$ and outputs it to the steering gear controller 10, and the steering gear controller 10 outputs the ordered rudder angle $U_c$ unchanged to the steering gear 2, in order to push back the turning of the ship 3 in the direction in which the drift angle $\phi_d$ is worsening, and also to turn the ship 3 in the direction in which the drift angle $\phi_d$ moves closer to zero. This steering changes the direction in which the ship 3 is moving, and the heading $\phi$ moves closer to the charted course $\phi_c$.

In this embodiment, the timing at which the turning angular velocity $\phi_d'$ begins to decrease and the drift angle $\phi_d$ is in the positive region (S103→S104), or the timing at which the turning angular velocity $\phi_d'$ begins to increase and the drift angle $\phi_d$ is in the negative region (S103→S107), is detected, and the steering stop controller 9 instructs the steering gear controller 10 to stop steering (S105). Once the rudder takes effect and the turning angular velocity $\phi_d'$ finally changes from positive to negative, or from negative to positive, a steering restart command is issued (S101→S108).

The ordered rudder angle $U_c$ outputted by the control computer 8 here moves farther away from neutral the greater is the divergence of the drift angle $\phi_d$ from zero, or the greater is the rate at which the drift angle $\phi_d$ changes in the direction in which this divergence is expanding. However, if the rudder angle here is too large, then when the drift angle $\phi_d$ which was increasing its divergence from zero inverts and moves closer to zero by the action of the rudder, and swings to the opposite side past zero, the operation for inverting the direction of the rudder to deal with this ends up being delayed (resistance also acts on the rudder due to water flow), and there is the risk that the drift angle $\phi_d$ will end up expanding to the opposite side. Therefore, if the control simply follows the ordered rudder angle $U_c$ of the control computer 8, the heading $\phi$ will not conform to the charted course $\phi_c$, the swing of the drift angle $\phi_d$ will spread out, and the ship 3 will exhibit behavior in which it zigzags greatly.

With the automatic steering device 1 in this embodiment, as discussed above, the steering stop controller 9 detects the timing at which the turning angular velocity $\phi_d'$ begins to decrease while the drift angle $\phi_d$ is in the positive region, or the timing at which the turning angular velocity $\phi_d'$ begins to increase while the drift angle $\phi_d$ is in the negative region, the rudder is considered to start taking effect at this timing, and the rudder is fixed by a steering stop command so that there will be no change in the rudder angle at that point in time. Therefore, since the excessive turning of the rudder can be suppressed even when the drift angle $\phi_d$ swings widely to one side, rudder corrections corresponding to situations in which the drift angle $\phi_d$ subsequently returns can be made quickly. As a result, the stability of the automatic steering can be improved.

Furthermore, the above-mentioned steering stoppage is released by a steering restart command at the point when the turning angular velocity $\phi_d'$ has crossed zero, after which the steering is carried out normally. The zero crossing of the turning angular velocity $\phi_d'$ means that the drift angle $\phi_d$ has begun to change in a direction in which its divergence from zero becomes smaller, so if the steering is restarted at this timing, it prevents a delay in rudder return control, and further stabilizes the automatic steering. Furthermore, since this involves simple control in which the stopping and restarting of steering is switched, rather than complicated control in which the parameters of the above-mentioned P control and D control are changed, the load on the automatic steering device 1 is reduced, and this contributes to lower costs.

However, a ship on the sea is subjected to a wide variety of external disturbances, so even after the timing at which the steering stop controller 9 considers that the rudder has started to take effect as discussed above, it is certainly possible that the drift angle $\phi_d$ will again diverge from zero at an increasing rate. To deal with this, in this embodiment, after a steering stop command has been issued, if the drift angle $\phi_d$ is in the positive region and the turning angular velocity $\phi_d'$ begins to increase (S103→S104), or if the drift angle $\phi_d$ is in the negative region and the turning angular velocity $\phi_d'$ begins to decrease (S103→S107), the steering stop controller 9 outputs a steering restart command to the steering gear controller 10 (S106, S108). Consequently, if the ship 3 is subjected to even greater external disturbances while steering is stopped, the steering stoppage is released, and the rudder can be turned appropriately, so both stability and flexibility can be achieved in automatic steering.

Figure 4:
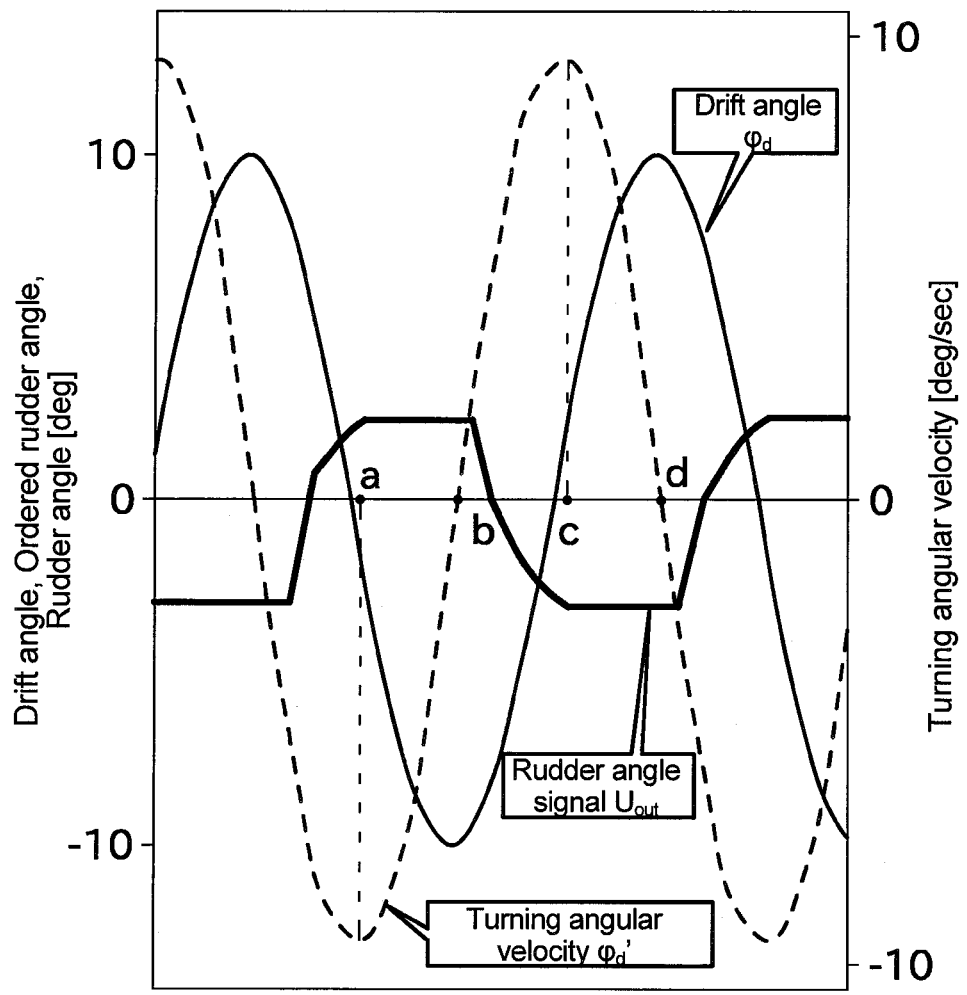
FIG. 4 is a graph of rudder control in this embodiment when the heading has been moved in a sine wave pattern with a ship simulation.

Next, the specific control in this embodiment will be described through reference to FIGS. 4 and 5. FIG. 4 shows control of the rudder in this embodiment when the heading has been moved in a sine wave pattern with a ship simulation.

The time point indicated by a in FIG. 4 represents the point at which the drift angle $\phi_d$ is in the negative region and the divergence from zero is increasing, but the rate of increase in this divergence has begun to decrease (the point at which the turning angular velocity $\phi_d'$ is at its maximum, the inflection point of the drift angle $\phi_d$, the angular velocity inversion timing). Since a steering stop command is issued by the steering stop controller 9 here (S103→S107→S105), it can be seen that the change in the rudder angle signal $U_{out}$ stops at that point, and a constant value is maintained. Thus, the rudder angle signal $U_{out}$ is controlled to be slightly more moderate than the ordered rudder angle $U_c$, and as a result, excessive turning of the rudder is suppressed.

The time point indicated by b in FIG. 4 represents the point at which the turning angular velocity $\phi_d'$ crosses zero (the point at which the drift angle $\phi_d$ exhibits its extreme value, the drift angle inversion timing) after the above-mentioned steering stop command. Since a steering restart is ordered by the steering stop controller 9 at this point (S101→S108), the steering gear controller 10 drives the steering gear 2 as far as it will go to match the current, fixed rudder angle signal $U_{out}$ to the ordered rudder angle $U_c$. As a result, the rudder angle signal $U_{out}$ that was being held constant at a relatively moderate value suddenly returns to close to zero, after which it changes along with the ordered rudder angle $U_c$. As discussed above, a quick rudder turning operation is realized.

The time point indicated by c in FIG. 4 represents the point at which the drift angle $\phi_d$ is i the positive region and its divergence from zero is increasing, but the rate of increase in this divergence has begun to decrease (the point at which the turning angular velocity $\phi_d'$ exhibits its extreme value, the inflection point of the drift angle $\phi_d$, the angular velocity inversion timing). Since a steering stop is ordered by the steering stop controller 9 at this point (S103→S104→S105), the change in the rudder angle signal $U_{out}$ stops at this point, and is held at a constant value. Thus, the rudder angle signal $U_{out}$ is controlled to be slightly more moderate than the ordered rudder angle and as a result excessive turning of the rudder is suppressed.

The time point indicated by d in FIG. 4 represents the point at which the turning angular velocity $\phi_d'$ crosses zero (the point at which the drift angle $\phi_d$ exhibits its extreme value, the drift angle inversion timing) after the above-mentioned steering stop command. Since a steering restart is ordered by the steering stop controller 9 at this point (S101→S108), the rudder angle signal $U_{out}$ that was being held constant at a relatively moderate value suddenly returns to close to zero, after which it changes along with the ordered rudder angle $U_c$. As discussed above, a quick rudder turning operation is realized.

What is plotted as the drift angle $\phi_d$ and the turning angular velocity $\phi_d'$ in the graph in FIG. 4 is data prior to the averaging done by the PLL 7, but the determination of whether to order a stoppage or restart of steering is made based on the drift angle $\phi_d$ and the turning angular velocity $\phi_d'$ after averaging by the PLL 7. Therefore, it should be noted that the averaging will entail a certain amount of delay by the point when the stoppage or restart of steering is actually ordered, from the timing of a to d.

Figure 5:
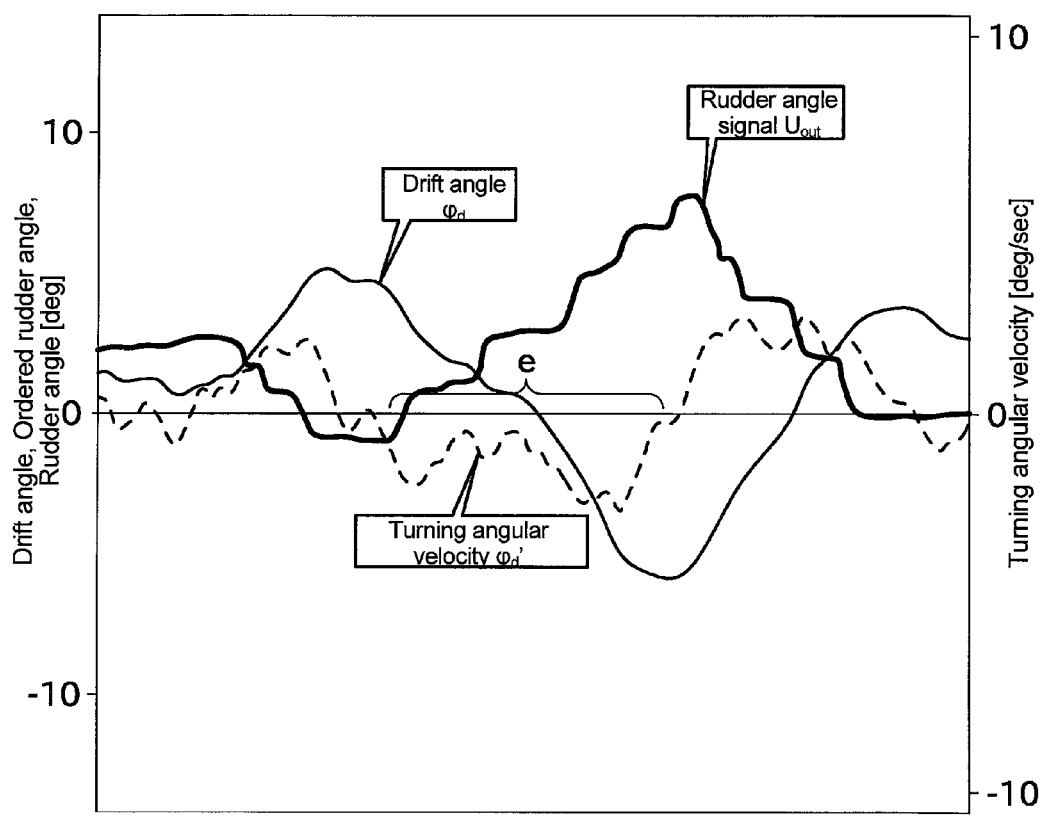
FIG. 5 is a graph of rudder control in this embodiment when an actual automatic steering test was conducted at sea.

FIG. 5 shows the rudder control in this embodiment when an actual automatic steering test was conducted at sea.

With the simulation in FIG. 4, the turning angular velocity $\phi_d'$ traced a neat sine wave, whereas in FIG. 5, by contrast, the curve reflects the various external disturbances to which the ship 3 is actually subjected at sea. For example, in the region indicated by e in the graph, the turning angular velocity $\phi_d'$ repeatedly increases and decreases at a short period, while the drift angle $\phi_d$ moves closer to zero from the positive side, and then crosses zero and becomes negative, after which its divergence from zero increases.

In this situation, the steering stop controller 9 alternately orders steering to be stopped and restarted every time the turning angular velocity $\phi_d'$ forms an extreme value (that is, every time the angular acceleration $\phi_d''$ crosses zero, and the angular velocity inversion timing and the second angular velocity inversion timing are alternately detected), and as a result the actual rudder angle changes in stages. When the ship 3 is thus subjected to even larger external disturbances during steering stoppage, for example, if necessary the steering stoppage is released and the rudder can be controlled to achieve a sharper rudder angle, so automatic steering with excellent flexibility can be achieved.

Here, when a ship is subjected to external disturbances of various directions and size, its drift angle and turning angular velocity exhibit behavior with an extremely high frequency of increase and decrease (so that high-frequency vibrations are superposed with low-frequency vibrations). Continually turning the rudder by PID control to keep up with this behavior of drift angle and turning angular velocity can make the vessel much more uncomfortable to be one, and markedly increase its fuel consumption. In particular, with a sailboat or the like that is usually not powered while sailing, this increase in fuel consumption can become a serious problem. In this respect, with this embodiment, rudder tracking is allowed only when the situation worsens in fine fluctuations, which suppresses excessive steering and solves the above-mentioned problem.

A preferred embodiment of the present invention was described above, but the above configuration can be modified as follows.

In the above embodiment, steering stoppage was ordered instantly as soon as the angular velocity inversion timing was detected, and steering restarting was ordered instantly as soon as the drift angle inversion timing or the second angular velocity inversion timing was detected, but the steering stoppage and restarting can be done based on the above-mentioned inversion timing, and the command can be delayed somewhat.

In the above embodiment, the turning angular velocity $\phi_d'$ and the angular acceleration $\phi_d''$ were found by calculating the drift angle $\phi_d$ by first- or second-order differentiation, but the configuration can be such that an angular velocity sensor is installed in the ship 3, and the turning angular velocity $\phi_d'$ and so forth are found based on the output of this angular velocity sensor.

Calculation of the ordered rudder angle $U_c$ by the control computer 8 can be based on PD control or the like, rather than the above-mentioned PID control.

In the above embodiment, the automatic steering device 1 was made up of software and hardware, but some or all of the functions of the automatic steering device 1 can be accomplished with dedicated hardware.

The automatic steering device of the present invention can be installed not only in boats and ships, but also in airplanes, automobiles, or any other moving vehicle.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An automatic steering device comprising:
    a drift angle acquisition component configured to acquire a drift angle, with the drift angle being a deviation angle of a heading with respect to a target heading;
    a turning angular velocity acquisition component configured to acquire a turning angular velocity, with the turning angular velocity being a rate at which the drift angle changes;
    a controller configured to calculate a rudder angle based on at least the drift angle and the turning angular velocity, the controller being further configured to output the rudder angle as an ordered rudder angle;
    an angular velocity inversion timing acquisition component configured to acquire an angular velocity inversion timing, with the angular velocity inversion timing being a timing at which the turning angular velocity changes from a direction in which a divergence of the drift angle from zero increases to a direction in which the divergence decreases;
    a steering stop command component configured to order a steering stop based on the angular velocity inversion timing; and
    a steering gear controller configured to change a rudder angle of a steering gear based on the ordered rudder angle, the steering gear controller being further configured to control the rudder angle of the steering gear to maintain the rudder angle unchanged while a command of the steering stop has been received from the steering stop command component.

2. The automatic steering device as defined in claim 1, further comprising
    a drift angle inversion timing acquisition component configured to acquire a drift angle inversion timing, with the drift angle inversion timing being a timing at which the divergence of the drift angle from zero that has been increasing starts to decrease, and a steering restart command component configured to order a steering restart based on the drift angle inversion timing while the steering stop has been ordered by the steering stop command component.

3. The automatic steering device according to claim 2, further comprising a second angular velocity inversion timing acquisition component configured to acquire a second angular velocity inversion timing, with the second angular velocity inversion timing being a timing at which the turning angular velocity changes from the direction in which the divergence of the drift angle from zero increases to the direction in which the divergence decreases, and a steering restart command component configured to order a steering restart based on the second angular velocity inversion timing while the steering stop has been ordered by the steering stop command component.

4. The automatic steering device according to claim 2, wherein the controller is further configured to continue calculating and outputting the rudder angle based on at least the drift angle and the turning angular velocity, even in a state in which the steering stop command component has ordered the steering stop, and the steering gear controller is further configured to change the rudder angle of the steering gear based on the current ordered rudder angle from the controller while the steering restart command component has ordered the steering restart.

5. The automatic steering device according to claim 1, further comprising a second angular velocity inversion timing acquisition component configured to acquire a second angular velocity inversion timing, with the second angular velocity inversion timing being a timing at which the turning angular velocity changes from the direction in which the divergence of the drift angle from zero increases to the direction in which the divergence decreases, and a steering restart command component configured to order a steering restart based on the second angular velocity inversion timing while the steering stop has been ordered by the steering stop command component.

6. The automatic steering device according to claim 5, wherein the controller is further configured to continue calculating and outputting the rudder angle based on at least the drift angle and the turning angular velocity, even in a state in which the steering stop command component has ordered the steering stop, and the steering gear controller is further configured to change the rudder angle of the steering gear based on the current ordered rudder angle from the controller while the steering restart command component has ordered the steering restart.

7. An automatic steering method in which an ordered rudder angle is outputted to a steering gear to match a heading to a target heading, the method comprising:

acquiring a drift angle, with the drift angle being a deviation angle of the heading with respect to the target heading;

acquiring a turning angular velocity, with the turning angular velocity being a rate at which the drift angle changes;

calculating a rudder angle based on at least the drift angle and the turning angular velocity, and outputting the rudder angle as an ordered rudder angle;

acquiring an angular velocity inversion timing, with the angular velocity inversion timing being a timing at which the turning angular velocity changes from a direction in which a divergence of the drift angle from zero increases to a direction in which the divergence decreases;

ordering a steering stop based on the angular velocity inversion timing; and changing a rudder angle of the steering gear based on the ordered rudder angle, and controlling the rudder angle of the steering gear to maintain the rudder angle unchanged while a command of the steering stop has been received.

8. The automatic steering method according to claim 7, further comprising acquiring a drift angle inversion timing, with the drift angle inversion timing being a timing at which the divergence of the drift angle from zero that has been increasing starts to decrease, and ordering a steering restart based on the drift angle inversion timing while the steering stop has been ordered.

9. The automatic steering method according to claim 8, further comprising acquiring a second angular velocity inversion timing, with the second angular velocity inversion timing being a timing at which the turning angular velocity changes from the direction in which the divergence of the drift angle from zero increases to the direction in which the divergence decreases, and ordering a steering restart based on the second angular velocity inversion timing while the steering stop has been ordered.

10. The automatic steering method according to claim 8, wherein continuing to calculate and output the rudder angle based on at least the drift angle and the turning angular velocity, even in a state in which a command of the steering stop has been received, and changing the rudder angle of the steering gear based on the current ordered rudder angle while a command of the steering restart has been received.

11. The automatic steering method according to claim 7, further comprising acquiring a second angular velocity inversion timing, with the second angular velocity inversion timing being a timing at which the turning angular velocity changes from the direction in which the divergence of the drift angle from zero increases to the direction in which the divergence decreases, and ordering a steering restart based on the second angular velocity inversion timing while the steering stop has been ordered.

12. The automatic steering method according to claim 11, wherein continuing to calculate and output the rudder angle based on at least the drift angle and the turning angular velocity, even in a state in which a command of the steering stop has been received, and changing the rudder angle of the steering gear based on the current ordered rudder angle while a command of the steering restart has been received.

13. A non-transitory computer-readable medium storing an automatic steering program for outputting an ordered rudder angle to a steering gear to match a heading to a target heading, the program causing an automatic steering device to execute processing that includes:
    acquiring a drift angle, with the drift angle being a deviation angle of the heading with respect to the target heading;
    acquiring a turning angular velocity, with the turning angular velocity being a rate at which the drift angle changes;
    calculating a rudder angle based on at least the drift angle and the turning angular velocity, and outputting the rudder angle as an ordered rudder angle;
    acquiring an angular velocity inversion timing, with the angular velocity inversion timing being a timing at which the turning angular velocity changes from a direction in which a divergence of the drift angle from zero increases to a direction in which the divergence decreases;
    ordering a steering stop based on the angular velocity inversion timing; and
    changing a rudder angle of the steering gear based on the ordered rudder angle, and controlling the rudder angle of the steering gear to maintain the rudder angle unchanged while a command of the steering stop has been received.

14. The non-transitory computer-readable medium according to claim 13, wherein the program further causes the automatic steering device to execute processing that includes
    acquiring a drift angle inversion timing, with the drift angle inversion timing being a timing at which the divergence of the drift angle from zero that has been increasing starts to decrease, and
    ordering a steering restart based on the drift angle inversion timing while the steering stop has been ordered.

15. The non-transitory computer-readable medium according to claim 14, wherein the program further causes the automatic steering device to execute processing that includes
    acquiring a second angular velocity inversion timing, with the second angular velocity inversion timing being a timing at which the turning angular velocity changes from the direction in which the divergence of the drift angle from zero increases to the direction in which the divergence decreases, and
    ordering a steering restart based on the second angular velocity inversion timing while the steering stop has been ordered.

16. The non-transitory computer-readable medium according to claim 14, wherein the program further causes the automatic steering device to execute processing that includes
    continuing to calculate and output the rudder angle based on at least the drift angle and the turning angular velocity, even in a state in which a command of the steering stop has been received, and
    changing the rudder angle of the steering gear based on the current ordered rudder angle while a command of the steering restart has been received.

17. The non-transitory computer-readable medium according to claim 13, wherein the program further causes the automatic steering device to execute processing that includes
    acquiring a second angular velocity inversion timing, with the second angular velocity inversion timing being a timing at which the turning angular velocity changes from the direction in which the divergence of the drift angle from zero increases to the direction in which the divergence decreases, and
    ordering a steering restart based on the second angular velocity inversion timing while the steering stop has been ordered.

18. The non-transitory computer-readable medium according to claim 17, wherein the program further causes the automatic steering device to execute processing that includes
    continuing to calculate and output the rudder angle based on at least the drift angle and the turning angular velocity, even in a state in which a command of the steering stop has been received, and
    changing the rudder angle of the steering gear based on the current ordered rudder angle while a command of the steering restart has been received.

\* \* \* \* \*